United States Patent
Eberhardt, Jr.

(10) Patent No.: US 6,798,389 B1
(45) Date of Patent: Sep. 28, 2004

(54) ELECTRONIC TAGS INCORPORATING A CUSTOMER ATTRACTING ANNUNCIATOR FOR USE IN ELECTRONIC PRODUCT INFORMATION DISPLAY SYSTEMS

(75) Inventor: Mark E. Eberhardt, Jr., Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/302,651

(22) Filed: Apr. 30, 1999

(51) Int. Cl.[7] .............................................. G09G 5/00
(52) U.S. Cl. ........................................ 345/3.1; 345/1.1
(58) Field of Search .......................... 345/3.1; 705/20, 705/642, 661.03; 340/5.91, 825.36

(56) References Cited

U.S. PATENT DOCUMENTS

| | | | |
|---|---|---|---|
| 4,011,002 A | * 3/1977 | Ebihara et al. | 345/90 |
| 4,272,717 A | * 6/1981 | Bailey | 323/226 |
| 4,353,063 A | * 10/1982 | Devlin | 345/781 |
| 4,924,363 A | 5/1990 | Kornelson | 362/125 |
| 5,111,606 A | * 5/1992 | Reynolds | 40/661.02 |
| 5,233,773 A | * 8/1993 | Reynolds | 40/661.03 |
| 5,461,297 A | * 10/1995 | Crawford | 320/1 |
| 5,515,071 A | * 5/1996 | Cho | 340/815.4 |
| 5,537,126 A | * 7/1996 | Kayser et al. | 345/1 |
| 5,736,967 A | * 4/1998 | Kayser et al. | 345/1 |
| 5,753,900 A | * 5/1998 | Goodwin, III et al. | 235/383 |
| 5,829,878 A | * 11/1998 | Weiss et al. | 271/3.08 |
| 5,870,714 A | * 2/1999 | Shetty et al. | 340/825.49 |
| 5,896,116 A | * 4/1999 | Torizuka et al. | 313/500 |
| 5,929,770 A | * 7/1999 | Faita | 340/825.35 |
| 5,988,498 A | * 11/1999 | Hoell | 235/377 |
| 6,012,244 A | 1/2000 | Begum et al. | 40/651 |
| 6,047,263 A | * 4/2000 | Goodwin, III | 235/375 |
| 6,140,811 A | * 10/2000 | Little | 324/115 |
| 6,269,342 B1 | * 7/2001 | Brick et al. | 235/383 |

FOREIGN PATENT DOCUMENTS

WO     WO 97/27791     7/1997

* cited by examiner

*Primary Examiner*—Xiao Wu
*Assistant Examiner*—Kevin M. Nguyen
(74) *Attorney, Agent, or Firm*—Thompson Hine LLP (57) ABSTRACT

An electronic tag having a customer attracting annunciator such as a light emitting element or sound element is provided. In one aspect, a tag constructed for sideward direction of lighting is provided. In another aspect, a battery free tag including a customer attracting annunciator which is energized with power derived from induced signals developed in the tag. In a further aspect, an annunciator of an electronic tag is controlled based upon signals output from an LCD display driver.

6 Claims, 7 Drawing Sheets

ELECTRONIC TAGS INCORPORATING A CUSTOMER ATTRACTING ANNUNCIATOR FOR USE IN ELECTRONIC PRODUCT INFORMATION DISPLAY SYSTEMS

TECHNICAL FIELD

The present invention relates generally to electronic product information display systems, and more particularly to an electronic tag adapted for attachment to a tag rail having a conductor extending therealong for inductive coupling therewith, the electronic tag including an attractor light and/or sound element for attracting the attention of consumers to items on display.

BACKGROUND

The concept of electronic product information display systems is becoming more and more popular. For example, a system which utilizes an inductive coupling technique to provide power and information to a plurality of electronic display tags is disclosed in U.S. Pat Nos. 5,537,126 and 5,736,967, the complete specifications of which are incorporated herein by reference. Other types of electronic product information display systems may utilize RF communication between the electronic display tags and a controller.

The advent of such electronic product information display systems has created an ever expanding interest in additional features which can be included in the electronic display tags to provide additional benefits to system users. For example, in any sales environment it is desirable to attract customers to certain items which may be new or on sale. One manner of attracting a customer's attention in an electronic product information display environment is to include a switched light on a display tag. U.S. Pat. No. 5,753,900 provides an example of such a switched light in an electronic price label. However, the switched light arrangement provided in U.S. Pat. No. 5,753,900 is considered disadvantageous in that it requires a battery within the electronic tag necessitating replacement which can be labor intensive and expensive, and in that it is not considered to provide suitable customer attraction under all circumstances, particularly where a customer is walking along the ends of adjacent aisles, such as in a supermarket, and the tag and its associated item are located at a relatively central location within aisles.

Further, many known tag constructions utilize customized controlling circuitry in the form of an application-specific integrated circuit ("ASIC") which controls the display of information on an LCD display. It would be undesirable to have to create a new customized ASIC simply in order to accommodate and control an additional light emitting element such as an LED, small light bulb, or other type of annunciator such as a piezoelectric beeper.

Accordingly, it would be desirable and advantageous to provide a battery free electronic tag having a customer attracting light and/or sound element. Further, it would be desirable and advantageous to provide an electronic tag with a directed light emitting element for attracting the attention of customer's from a distance down an aisle. Still further, it would be desirable and advantageous to provide a product information display tag having an LCD screen and a separate customer attracting light and/or sound element which is controlled by one or more signals available from the circuit provided for controlling the LCD display screen.

SUMMARY OF THE INVENTION

In one aspect of the present invention an electronic tag installable along a shelf-edge rail of a product information display system is provided. The electronic tag includes a housing having a front side for facing outwardly from a shelf-edge, the front side including a generally planar portion and a light protecting cover portion extending therefrom, the light protecting cover portion including at least one opening therethrough. At least one light emitting element is positioned to direct light out from the opening for attracting the attention of customers. The housing includes top, bottom, and first and second sides and the opening and the light emitting element are positioned such that light is directed to at least one of the first and second sides for attracting the attention of customers from a distance down an aisle in which the tag may be placed. This tag configuration facilitates attraction of customers even as they walk along the ends of adjacent aisles.

In another aspect of the present invention a battery free electronic tag installable along a shelf-edge rail of a product information display system which includes a conductor extending along the rail is provided. The electronic tag includes at least one annunciator selected from the group consisting of light emitting elements and sound emitting elements, for attracting the attention of customers when energized. A pick-up coil is provided in the tag for inductively receiving a signal from a conductor when positioned in close proximity thereto. A power supply circuit is connected to the pick-up coil for receiving the induced signal and energizing the annunciator with energy derived from the induced signal. This tag configuration provides power for the annunciator without requiring the use of a battery and thus eliminates the labor and expense associated with battery use and replacement. A corresponding method of powering an annunciator of an electronic tag which is positioned adjacent a conductor of a product information display system involves (a) providing a pick-up coil in the tag for inductively receiving a signal from the conductor, and (b) repeatedly: (i) charging a capacitor using energy received from the signal induced in the pick-up coil, and (ii) discharging the capacitor through the annunciator to energize the annunciator.

A further aspect of the present invention provides an electronic product information display tag having an LCD display for displaying product information, a display driver connected for controlling the LCD display, and at least one light emitting element for attracting a customer's attention when energized. A display signal decoding circuit is connected for receiving at least one display control signal from the display driver, the display signal decoding circuit is connected for controlling energization of the light emitting element based upon a display control signal received from the display driver. This tag configuration facilitates control of a customer attracting light based upon signals available from existing circuitry which might be provided in a customized ASIC chip of a tag, although the configuration could be utilized in non-ASIC tags. A corresponding method of controlling an annunciator of an electronic product information display tag including an LCD display screen and an LCD display driver, where the annunciator is a non-LCD type element, involves (a) producing at least one display control signal with the LCD display drive, and (b) controlling the energization of the annunciator based upon the produced display control signal.

DETAILED DESCRIPTION

Figure 1:
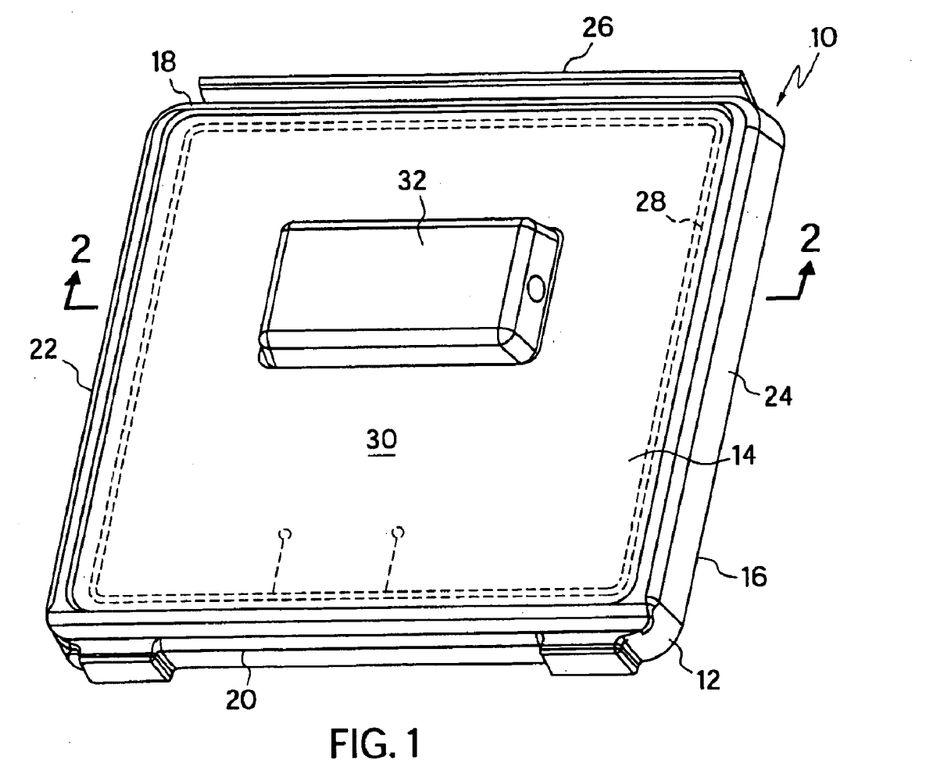
FIG. 1 is a front perspective view of one embodiment of an electronic tag including directed light emitting elements.

Referring to the drawings, FIG. 1 shows a front perspective view of an electronic tag according to one embodiment of the present invention in which the attractor light or lights are directed for attracting the attention of a customer from a distance down an aisle in which the tag may be placed. The electronic tag 10 includes a housing 12 having a front side 14 for facing outwardly from a shelf, a back side 16, and top, bottom, left and right sides 18, 20, 22 and 24, respectively. The top side 18 of the tag includes a rail engaging clip 26 for installing the tag along a shelf edge rail of a product information display system in which a conductor passes along the shelf edge rail, such as the systems shown and described in U.S. Pat. Nos. 5,537,126 and 5,736,967. The tag 10 includes a coil 28 for coupling with a conductor of such a product information display system to inductively receive signals therefrom, such signals typically being provided from a controller capable of providing power and information via such induced signals.

The front side 14 of the tag housing 12 includes a generally planar portion 30 and a light protecting cover portion 32 which extends outward beyond the planar portion 30. As best seen in the cross-sectional view of FIG. 2, the light protecting cover portion includes openings 34 and 36 therethrough with LEDs 38 and 40 positioned to direct light out from the openings 34 and 36 to respective sides 22 and 24 of the tag housing 12. Preferably, each opening and its respective LED are positioned and angled to direct light away from the planar portion of the housing at an angle φ no greater than about 60 degrees. This angular orientation facilitates direction of the light downward to the ends of an aisle in which the tag may be placed rather than perpendicularly outward from a shelf edge. However, even though the light is directed in this angular manner, it is recognized that due to the dispersive nature of light emitted from a source, some light will travel directly outward from the front face of the tag and therefore provide customer attraction even when a customer is positioned directly in front of such a tag. Maximum attraction of customers from long distances down an aisle can be achieved by positioning the openings 34 and 36 and respective LEDs 38 and 40 such that light is directed away from the planar portion of the housing at an angle φ between about 5 degrees and about 25 degrees, and preferably about 15 degrees. It is anticipated that overlays or printed labels could be use in conjunction with the tag 10 with a particular stores color scheme and some sort of sale message.

Figure 2:
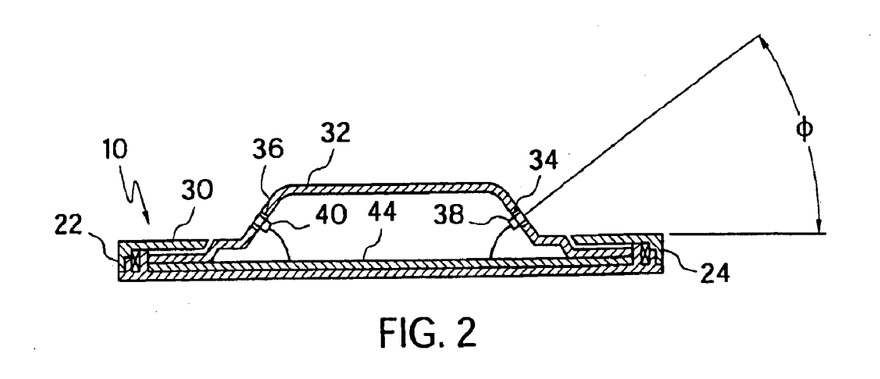
FIG. 2 is a cross-sectional view along line 2—2 of FIG. 1.

While FIGS. 1 and 2 illustrate an electronic tag 10 which operates in a standalone manner and does not include a product information display screen, it is recognized that an electronic tag having an LCD display screen could also include sidewardly directed customer attracting light elements. Further, non-inductive type tags, such as RF-type tags, including similar directed lighting arrangements are considered within the broadest scope of the directed lighting aspect of the invention. Accordingly, as used herein the terminology "electronic tag," unless otherwise limited, is considered to encompass both tags with an LCD or other type display screen and tags without such a display screen, as well as inductive type tags with a pick-up coil and non-inductive type tags such as RF-type tags. It is also recognized that reflectors, diffusers, and light pipes such as fiber optics could be used to change an LEDs aim, size or pattern.

Figure 3:
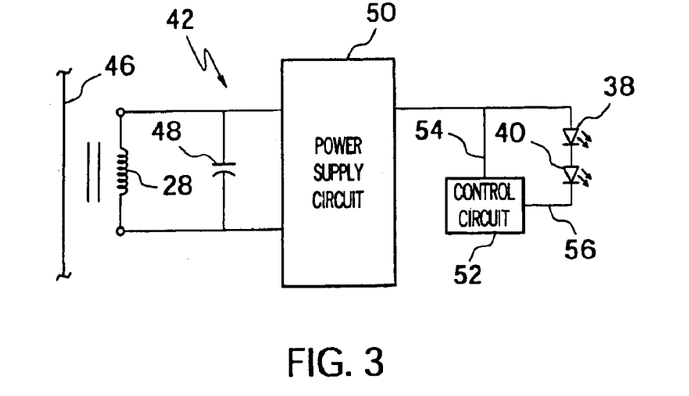
FIG. 3 is a high level circuit schematic for controlling an electronic tag having one or more annunciators such as light emitting elements and/or sound elements.
Figure 10:
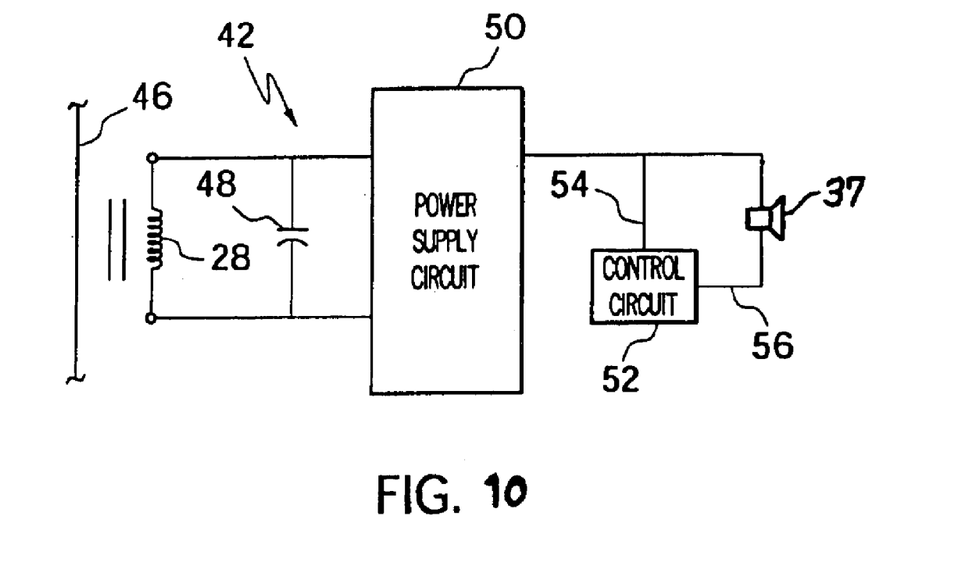
FIG. 10 is an embodiment showing a beeper in place of LEDs.

Referring to FIG. 3, a representative circuit 42 for deriving power for, and controlling the energization of LED 38 and 40 is shown, and such circuit 42 could be provided on electronic tag circuit board 44 shown in FIG. 2. Circuit 42 is connected to pick-up coil 28 of the tag to receive induced signals from a conductor 46 adjacent which the tag 10 may be positioned when installed in an electronic product information display system. A capacitor 48 is provided in parallel with pick-up coil 28 to provide a resonant circuit which is resonant at the frequency of the signals provided on conductor 46. A power supply circuit 50 is connected to the pick-up coil 28 for receiving induced signals and establishing a voltage source without the use of a battery. LEDs 38 and 40 are connected to the power supply circuit 50 for being energized by power therefrom. In this regard, a control circuit 52 is connected by a line 54 to receive power from the power supply circuit 50 and is also connected via line 56 to control energization of the LEDs 38 and 40 by controlling the delivery of power from power supply circuit 50 through the LEDs. Thus, circuit 42 provides a system in which power is derived from a signal induced on pick-up coil 28 and is controllably delivered to the LEDs 38 and 40 without requiring the use of a battery. Although the use of customer attracting LEDs is primarily described herein, it is recognized and understood that a similar circuit could be provided for energizing a customer attracting sound element such as a piezoelectric beeper 37 as shown in FIG. 10, or the circuit 42 could be used to control energization of both an LED and a piezoelectric beeper. As used herein, the term "annunciator" includes light emitting elements, such as LEDs or light bulbs, and sound producing elements, such as piezoelectric beepers, capable of attracting a customer's attention when energized.

Figure 4:
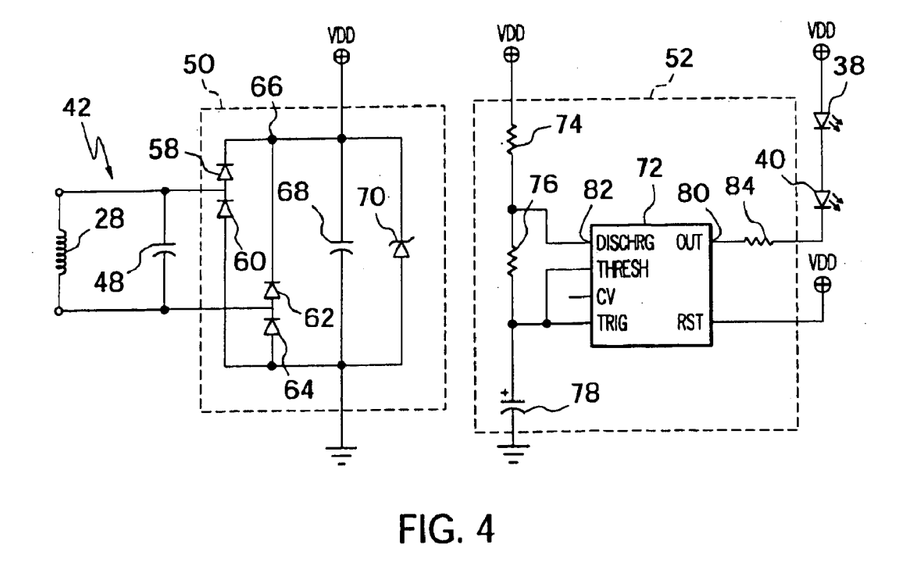
FIG. 4 is one embodiment of a circuit in accordance with FIG. 3.

One such embodiment of such a circuit 42 is shown in the schematic of FIG. 4. Power supply circuit 50 includes diodes 58, 60, 62 and 64 arranged as a rectifier to provide a rectified signal at node 66. The rectified signal charges capacitor 68 to provide a voltage source VDD for the control circuit 52 and LEDs 38 and 40. A Zener diode 70 with a selected breakdown voltage is provided in parallel with capacitor 68 to limit the voltage developed across capacitor 68, and thus VDD, to a suitable level such as about 12 volts. Control circuit 52 is formed by a timing circuit including a 555 timer 72 arranged with resistors 74 and 76 and capacitor 78 to provide timed energization of the LEDs 38 and 40 by controlling the output 80 of the 555 timer. In particular, as capacitor 78 charges the voltage thereacross increases and thus the voltage to a trigger input of the 555 timer 72 increases until a threshold level is reached causing a discharge input 82 of the 555 timer to go low to permit the capacitor 78 to discharge through resistor 76. Resistor 74 is preferably selected relatively large to provide a slow charge rate for the capacitor 78 and resistor 76 is preferably selected relatively low to provide a fast discharge rate for the capacitor 78. When the capacitor discharges through resistor 76 the output 80 of the 555 timer is brought low and the LEDs 38 and 40 are thus energized. A resistor 84 is provided to limit the current draw through the LEDs 38 and 40. Proper selection of resistors 74 and 76 and capacitor 78 provides low duty cycle energization of the LEDs 38 and 40 so that capacitor 68 is only partially discharged through the LEDs during such energization in order to constantly maintain a voltage level VDD sufficient for powering the control circuit 52. For example, where the maximum voltage across the capacitor 78 is set at 12 volts by Zener diode 70, and where the 555 timer 72 requires a 5 volt minimum power supply, such partial discharge of capacitor 78 would be limited so that the voltage across capacitor 78 does not fall below 5 volts.

Figure 5:
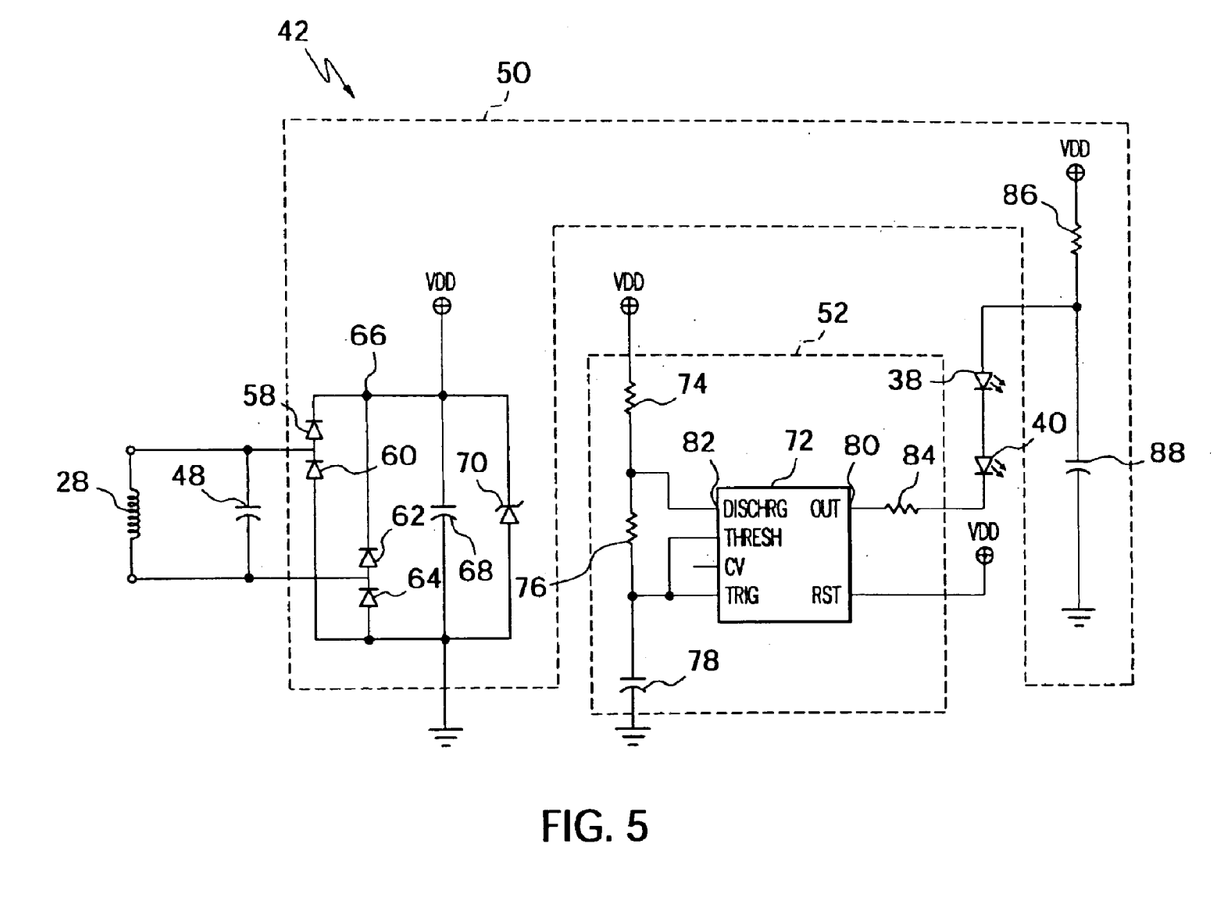
FIG. 5 is another embodiment of a circuit in accordance with FIG. 3.

An alternative embodiment for circuit 42 is shown in the schematic of FIG. 5. The operation of the embodiment of FIG. 5 is similar to that of the embodiment of FIG. 4 except that rather than discharging capacitor 68 through the LEDs 38 and 40, an additional resistor 86 and an additional capacitor 88 are provided, with capacitor 88 being discharged through the LEDs 38 and 40. In particular, capacitor 88 is charged through resistor 86 which is selected to provide a relatively slow charge rate for such capacitor 88. When the 555 timer 72 is triggered, capacitor 88 is discharged through LEDs 38 and 40 and resistor 84 which is selected to provide a relatively fast discharge rate of the capacitor 88. It is recognized that resistor 84 could also be positioned on the opposite side of LEDs 38 and 40, or even between the LED 38 and the LED 40. In the circuit of FIG. 5, capacitor 68 may be selected at a lower value than in the embodiment of FIG. 4 because capacitor 68 is not discharged through the LEDs 38 and 40. Capacitor 88 is connected between capacitor 68 and ground with resistor 86 being connected there between. Thus, resistor 86 not only affects the charge rate of the capacitor 88, but if selected high enough it also limits discharge of capacitor 68 through the LEDs to a negligible amount. In this arrangement, capacitor 88 can also be more fully discharged through the LEDs 38 and 40 without affecting the power delivered to the control circuit 52.

Although the circuits of FIGS. 3, 4 and 5 are described primarily with reference to electronic tags which do not include a product information display screen, it is contemplated that similar arrangements could be provided in such more advanced tags. Similarly, although the tag and circuits of FIGS. 1–5 primarily described a non-addressable tag, it is contemplated that such a non-display screen tag could include additional circuitry as described in U.S. Pat. No. 5,537,126 to make the tag addressable by a controller of a product information display system.

Figure 6:
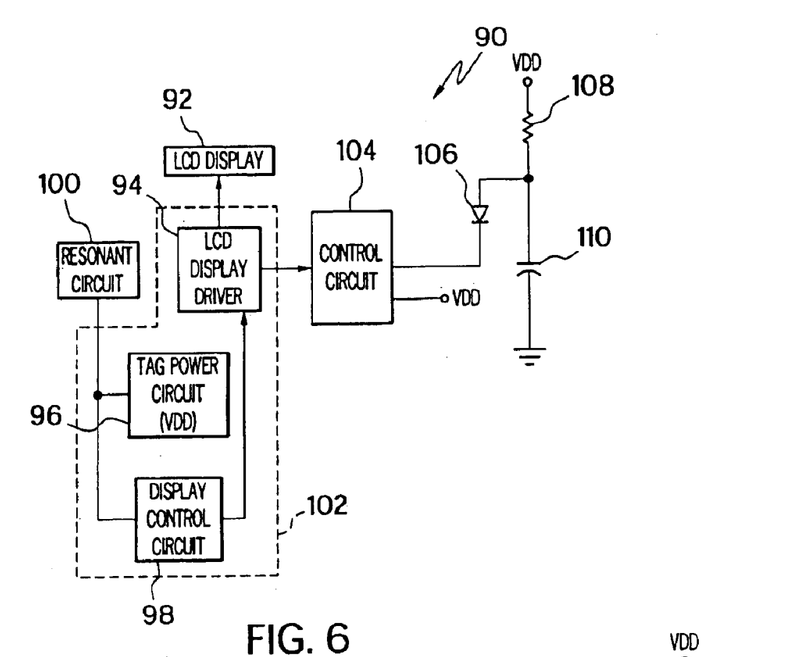
FIG. 6 is a high level circuit schematic for one embodiment of an electronic tag including both an LCD display and one or more annunciators.

Referring to FIG. 6, a circuit 90 is contemplated for an electronic product information display tag incorporating an LCD display 92 and corresponding LCD display driver 94. A power supply circuit 96, a display control circuit 98, and a resonant circuit 100 are likewise provided. The power supply circuit 96 and the display control circuit 98 may be configured as shown and described in U.S. Pat. No. 5,537, 126, with resonant circuit 100 receiving induced signals, power supply circuit 96 rectifying such signals and providing a voltage source to power the tag, and display control circuit 98 connected to receive the rectified signals from the power supply circuit 96 and to derive control information from such rectified signals. Alternatively, the display control circuit 98 can be connected directly to the resonant circuit 100 as shown. The control information would typically be provided by a controller of the product information display system which is connected to control the information displayed on a plurality of product information display tags distributed throughout a store. In many such electronic product information display tags, the circuitry may be provided in the form of an ASIC 102. In the circuit 90 of FIG. 6, a control circuit 104 compatible with the remaining circuitry of the tag is provided for controlling the energization of an LED 106 or other annunciator which can be used to attract the attention of a customer. Resistor 108 and capacitor 110 are provided and operate in a manner similar to resistor 86 and capacitor 88 of FIG. 5. Importantly, the energization of LED 106 is controlled by control circuit 104 based upon display driver signals received from the LCD driver 94. This arrangement enables the energization of LED 106 to be controlled based upon information received from the controller of a product information display system, such energization control information being incorporated within the LCD display data which is delivered to the tag on an addressable, selective basis.

Figure 7:
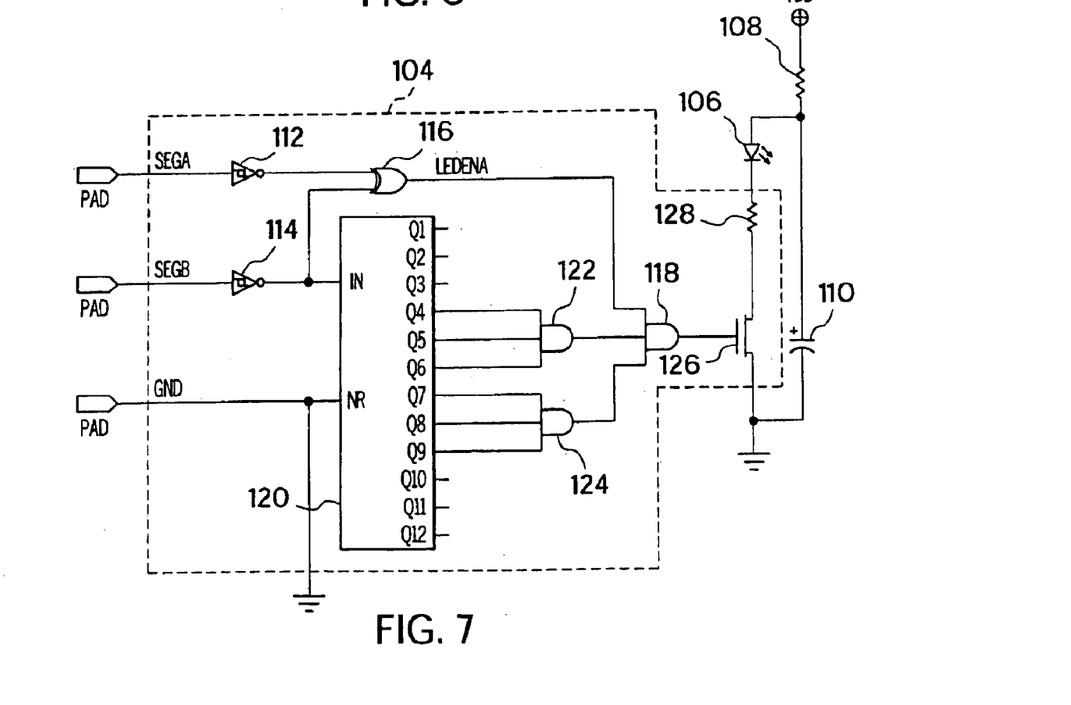
FIG. 7 is one embodiment of a circuit in accordance with FIG. 6.
Figure 8:
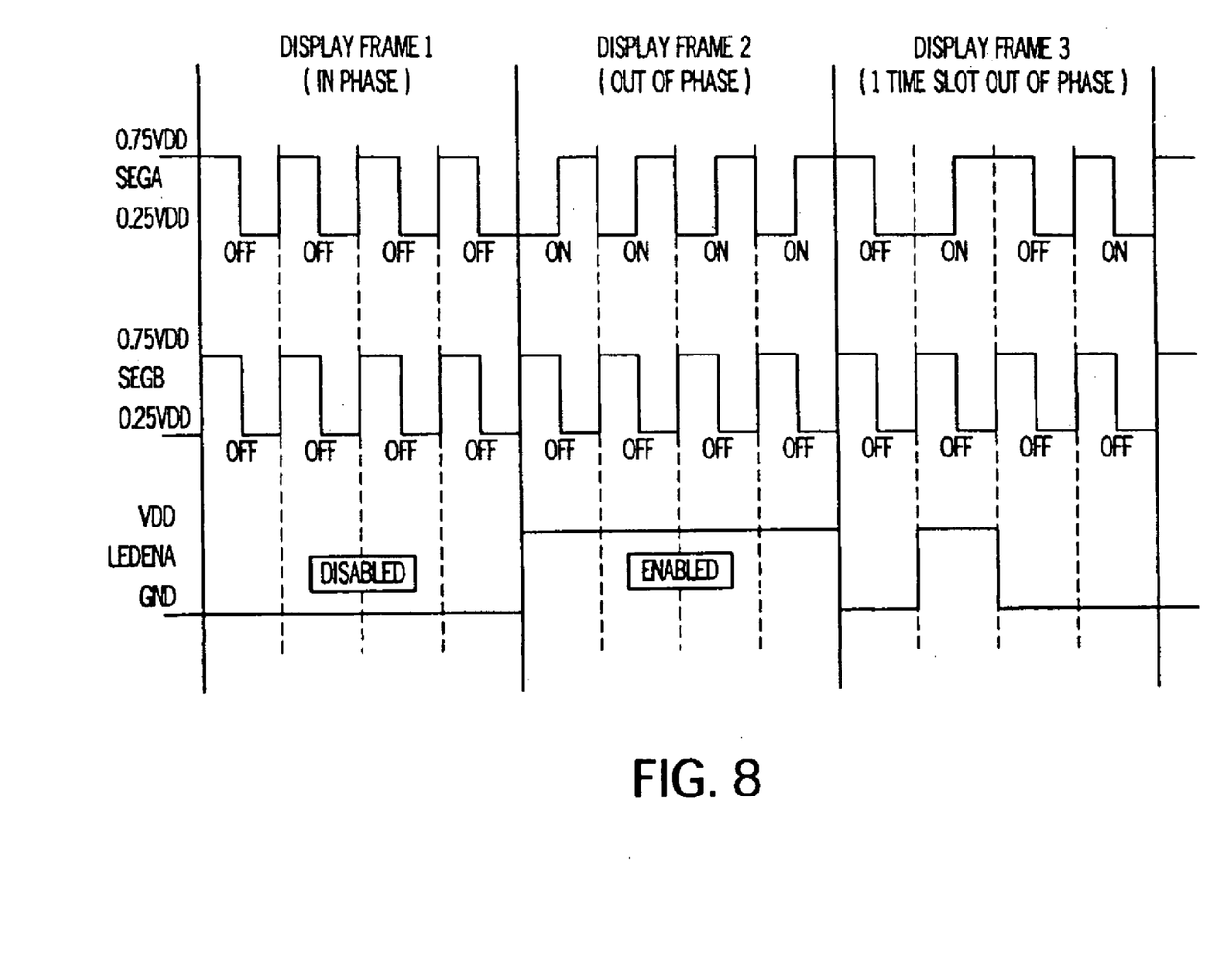
FIG. 8 is a diagram of LCD display control signals output by the LCD display driver of FIG. 6.

Referring to FIG. 7, one embodiment of a suitable control circuit 104, which essentially acts as a display signal decoding circuit, is shown in combination with LED 106, resistor 108 and capacitor 110. The LCD display driver 94 outputs segment control signals SEGA and SEGB which are used to control the energization of the LED 106. The SEGA and SEGB signals from the LCD display driver 94 are signals which vary between respective high states and respective low states, as shown in FIG. 8, the two signals having the same frequency. The SEGA and SEGB signals are fed into respective Schmitt triggers 112 and 114 to develop good logic levels. When the two signals are in phase as shown in display frame 1 of FIG. 8, the output (LEDENA) of EXCLUSIVE-OR gate 116 will be low, and when the two signals are out of phase as shown in display frame 2 of FIG. 8, the output of EXCLUSIVE-OR gate 116 will be high. The LEDENA output is provided to an AND gate 118 and thus acts to enable or disable the output of the AND gate 118. The SEGB signal is provided as an input to a counter 120. A combination of the frequency adjusted outputs of the counter 120 are provided to respective AND gates 122 and 124, and the output of each AND gate 122 and 124 is provided as an input to AND gate 118. The output of AND gate 118 controls the ON/OFF state of a MOSFET 126 or other electronic switching device. It is understood that the in series sequence of LED 106, resistor 128 and MOSFET 126 between capacitor 110 and ground could vary. In operation, when all inputs to AND gates 122 and 124 are high and when the LEDENA output of EXCLUSIVE-OR gate 116 is high, the output of AND gate 118 will also be high and MOSFET 126 will be placed in an ON state allowing capacitor 110 to discharge through LED 106 and resistor 128. In this regard, it is recognized that resistor 128 could also be positioned in series between capacitor 110 and LED 106. The duty cycle and frequency with which the LED 106 is energized will be established based upon (1) the outputs of the counter 120 which are selected and (2) the frequency of the SEGB signal input thereto. Accordingly, one manner of adjusting the flash rate of LED 106 in such a circuit is to adjust the refresh rate of the LCD display driver 94 which correspondingly adjusts the frequency of the SEGB signal which is input to the counter 120. In a product information display system, the display system controller may provide information to the tag which is utilized by the display control circuit 98 to adjust the refresh rate of the LCD display driver 94.

Figure 9:
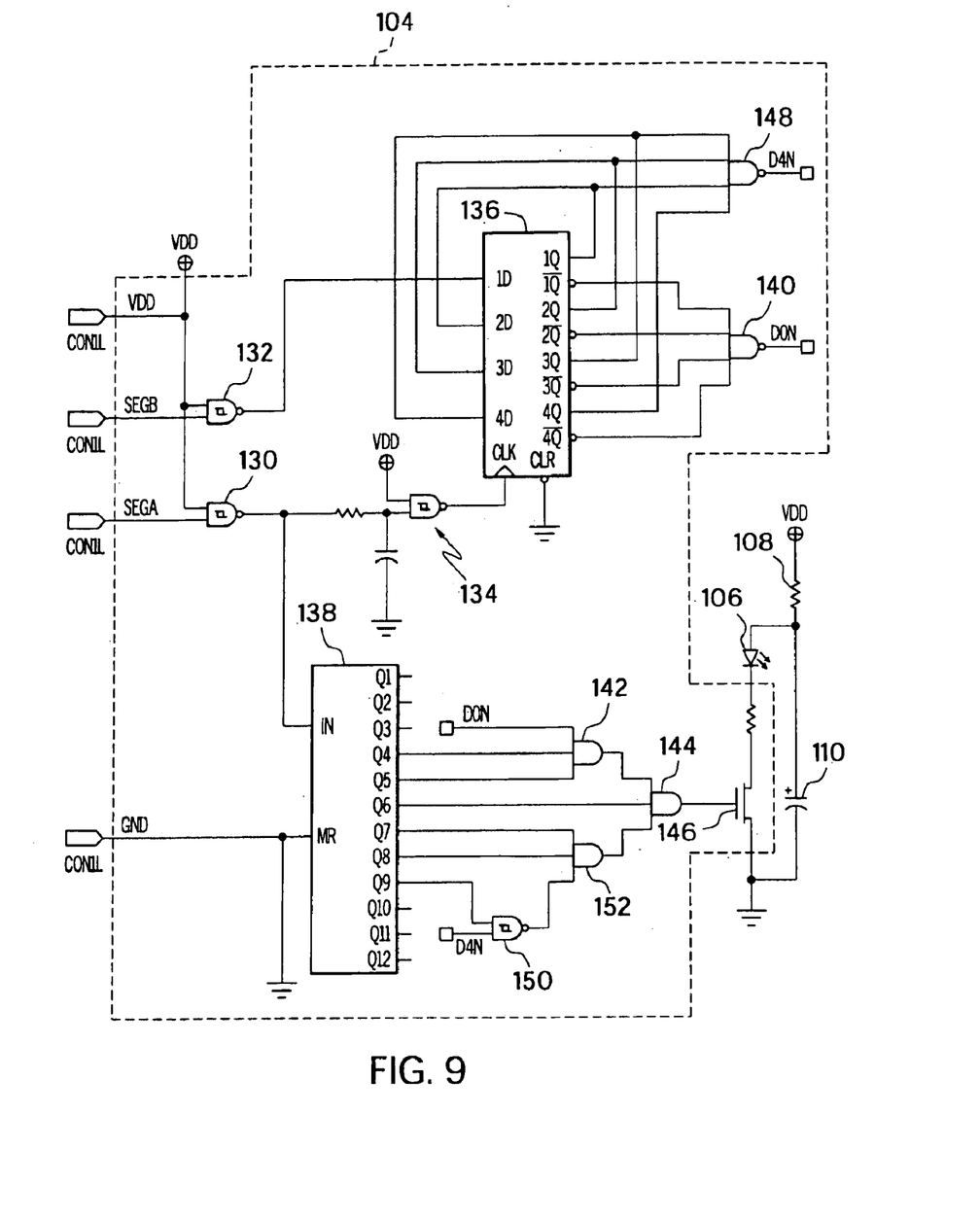
FIG. 9 is another embodiment of a circuit in accordance with FIG. 6.

Another embodiment of a control circuit 104 suitable for use in connection with outputs from LCD display driver 94 is shown in FIG. 9 in connection with LED 106, resistor 108, and capacitor 110. SEGA and SEGB signals from the display driver 94 are again fed into respective Schmitt triggers 130 and 132 to provide good logic levels. The logic adjusted SEGA signal is then fed through a delay circuit 134 and provided as a clock input to a shift register 136. The logic adjusted SEGA signal is also provided as an input to a counter 138. The logic adjusted SEGB signal is provided as an input to the shift register 136 and each time the register is clocked the state of the logic adjusted SEGB signal is checked to provide a logic one or logic zero input to the shift register 106. Each of the four shift register outputs, 1Q–4Q will contain LED enable data for each of the four time periods of a display frame. If SEGA and SEGB are in phase for all four time periods of the display frame as shown in display frame 1 of FIG. 8, then the shift registers outputs 1Q–4Q are all low and the output of NAND gate 140 (DON) will be low. Output DON is provided as an input to AND gate 142 which has an output connected as an input to AND gate 144, the output of AND gate 144 is connected for controlling the ON/OFF state of MOSFET 146. Thus, when the DON output of NAND gate 140 is low, energization of the LED 106 will be disabled because the output of AND gate 144 will necessarily be low.

If the SEGA and SEGB signals are out of phase for any of the four time periods of a display frame, such as shown in display frame 3 of FIG. 8, output DON will necessarily be high and thus will act as an enabling input to AND gate 142. If the SEGA and SEGB signals are out of phase for all the four time periods as shown in display frame 2 of FIG. 8, the output of NAND gate 148 (D4N) will be low. Output D4N is provided as an input to NAND gate 150, the output of NAND gate 150 being provided as an input to AND gate 152, and the output of AND gate 152 being provided as an input to AND gate 144. Thus, when the output D4N is low, the output of NAND gate 150 will always be high and therefore output D4N acts to disable the effect of counter output Q9 upon the energization of LED 106, resulting in a change of the energization rate of LED 106, particularly doubling the energization rate.

In the control circuit 104 of FIG. 9, the energization rate of LED 106 can also be adjusted by adjusting the refresh rate of the display driver 94. Further, the D4N output signal could be used in a circuit to select either one of two different LEDs of different colors to differentiate between sale item classifications. For example, a red flashing LED could indicate a 10% savings while a green flashing LED could indicate a 25% savings on an item. Additionally, circuitry could be provided to decode the outputs of shift register 136 to give up to five control states, particularly for the SEGA and SEGB signals being out of phase for zero to four of the time periods of any display frame. These extra states could be used to select and control LED flash rates, LEDs with different colors, and/or piezoelectric beepers or other sound elements.

A product information display tag may operate in a series of display pages that are sequenced to show more information than can fit in the LCD display panel at any one time. The control data associated with energizing the LED or piezoelectric beeper could be contained in one or more of the display pages, allowing the annunciator to be energized either continuously or when a specific display page is displayed (e.g., when the sale price is displayed).

In connection with various of the above-described electronic tags, a method of powering an annunciator of an electronic tag which is positioned adjacent a conductor of a product information display system involves (a1) providing a pick-up coil in the tag for inductively receiving a signal from the conductor, and (b1) repeatedly: (i) charging a capacitor using energy received from the signal induced in the pick-up coil, and (ii) discharging the capacitor through the annunciator to energize the annunciator. In step (b1)(ii) the capacitor may only partially discharged through the annunciator, such partial discharge enabling the capacitor to continuously maintain a voltage level sufficient for powering a control circuit. (See FIG. 4). Alternatively, the capacitor may be more fully discharged as described above with reference to FIGS. 5, 6, 7 and 9. A charge rate of the capacitor in step (b1)(i) is preferably substantially slower than a discharge rate of the capacitor in step (b1)(ii) for reducing loading upon the conductor and/or controller of the product information display system.

Further, a method of controlling an annunciator of an electronic product information display tag including an LCD display screen and an LCD display driver, where the annunciator is a non-LCD type element, is also provided and involves (a2) producing at least one display control signal with the LCD display drive, and (b2) controlling the energization of the annunciator based upon the produced display control signal. Typically, the display control signal of step (a2) is produced by an output of the LCD display driver which is not connected to the LCD display screen. In step (a2) first and second display control signals of the same frequency may be produced, and in step (b2) the energization of the annunciator may be controlled according to whether the first and second control signals are in phase. In step (b2) an energization rate of the annunciator may established by the display control signal of step (a2), such as by adjusting a refresh rate of the LCD display driver. Further, in addressable display tags, annunciator control information may be transferred to the display tag via inductive coupling with a pick-up coil of the display tag and the annunciator control information may be stored in memory of the display tag. The at least one display control signal may then be produced by the LCD display driver according to the annunciator control information stored in memory. It is also contemplated that within its broadest sense the inventive aspect of utilizing output signals of an LCD display driver to control the energization of a light emitting element or other annunciator could be incorporated within non-inductive type display tags, such as RF-type tags.

While the forms of the apparatus herein described constitute preferred embodiments of the invention, it is to be understood that the present invention is not limited to these precise forms and that changes may be made therein without departing from the scope of the invention. For example, while the circuit of FIGS. 6, 7 and 9 are primarily described as being used in conjunction with electronic product information display tags including ASIC type controls, it is contemplated that similar arrangement could be provide in non-ASIC tags. Further, while FIG. 1 shows a tag with a directed lighting scheme, it is recognized and contemplated that such directed lighting structure is not considered an essential part of the later described aspects of the invention, and that, unless specifically required by one of the following claims, the light emitting element need not be so directed. For example, tags with a simple, opening facing directly outward from the front side of the tag could be provided with an LED positioned therein. Further, in tags formed from plastic having suitable translucent characteristics, the LED could be positioned behind within the housing with no opening provided, in which case the housing would act as a subtle diffuser for emitted light. Still further, although the use of LEDs are primarily described herein, it is recognized that other annunciator types could be used either alone or in combination other annunciators.

What is claimed is:

1. A battery free electronic tag installable along a shelf-edge rail of a product information display system which includes a conductor extending along the rail, the electronic tag comprising:

a display screen for displaying product information;

at least one annunciator separate from the display screen and selected from the group consisting of light emitting elements and sound emitting elements, for attracting the attention of customers when energized;

a pick-up coil for inductively receiving a signal from a conductor when positioned in close proximity thereto;

a power supply circuit connected to the pick-up coil for receiving the induced signal and energizing the annunciator with energy received from the induced signal;

a control circuit;

wherein the power supply circuit comprises a first capacitor, a second capacitor, and a first resistor, the first capacitor connected to be charged by energy from the induced signal;

the control circuit connected to receive power from the power supply circuit;

the second capacitor connected between the first capacitor and ground for being charged;

the first resistor connected between the first capacitor and the second capacitor for affecting a charge rate of the second capacitor; and wherein the annunciator and a second resistor are connected in series to receive discharge energy from the second capacitor, the second resistor for affecting a discharge rate of the second capacitor through the annunciator.

2. The electronic tag of claim 1, further comprising:

a control circuit operatively connected to the pick-up coil for deriving control information from induced signals on the pick-up coil and to control energization of the annunciator according to the derived control information.

3. An electronic product information display tag, comprising:

a liquid crystal display for displaying product information;

a liquid crystal display driver connected for controlling the liquid crystal display;

at least one non-liquid crystal display type annunciator for attracting a customer's attention when energized; and a display signal decoding circuit connected for receiving at least one display control signal from the liquid crystal display driver, the display signal decoding circuit connected to the annunciator for controlling energization of the non-liquid crystal display type annunciator based upon a display control signal received from the liquid crystal display driver;

wherein the display signal decoding circuit is connected to receive two display control signals from the display driver, the two display control signals comprising signals which vary between respective high states and respective low states, the two display control signals having the same frequency, wherein the display signal decoding circuit energizes the non-liquid crystal display type annunciator according to whether or not the two display control signals are in phase with each other.

4. A method of controlling an annunciator of an electronic product information display tag including a liquid crystal display screen and a liquid crystal display driver, the annunciator comprising a non-liquid crystal display type element, the method comprising the steps of:

(a) producing at least one display control signal with the liquid crystal display driver;

(b) controlling the energization of the annunciator based upon the produced display control signal;

wherein in step (a) first and second display control signals of the same frequency are produced, and in step (b) the energization of the annunciator is controlled according to whether the first and second control signals are in phase.

5. A method of controlling an annunciator of an electronic product information display tag including a liquid crystal display screen and a liquid crystal display driver, the annunciator comprising a non-liquid crystal display type element, the method comprising the steps of:

(a) producing at least one display control signal with the liquid crystal display driver;

(b) controlling the energization of the annunciator based upon the produced display control signal; and adjusting an energization rate of the annunciator by adjusting a refresh rate of the liquid crystal display driver.

6. A method of controlling an annunciator of an electronic product information display tag including a liquid crystal display screen and a liquid crystal display driver, the annunciator comprising a non-liquid crystal display type element, the method comprising the steps of:

(a) producing at least one display control signal with the liquid crystal display driver;

(b) controlling the energization of the annunciator based upon the produced display control signal;

wherein step (a) comprises producing at least two display control signals and step (b) comprises controlling energization of the annunciator at one of a plurality of energization rates based upon comparison of the display control signals.

* * * * *